United States Patent
Laufenberg et al.

(10) Patent No.: US 8,022,677 B2
(45) Date of Patent: Sep. 20, 2011

(54) ELECTRICAL DEVICE AND OPERATING METHOD

(75) Inventors: Xaver Laufenberg, Freiberg (DE);
Dominique Eynius, Steinheim/Murr (DE); Helmut Suelzle, Freiberg (DE); Stephan Usbeck, Erdmannhausen (DE); Matthias Spaeth, Milford, MI (US); Miriam Neuser-Hoffmann, Bietigheim-Bissingen (DE); Christian Myrzik, Emmering (DE); Manfred Schmid, Pipinsried (DE); Franz Nietfeld, Rochester Hills, MI (US); Alexander Thiel, Bondorf (DE); Harald Braun, Dettenhausen (DE); Norbert Ebner, Ludwigsburg (DE)

(73) Assignees: Robert Bosch GmbH, Stuttgart (DE); Daimler Chrysler AG, Stuttgart (DE); BMW AG, Munich (DE)

( * ) Notice: Subject to any disclaimer, the term of this patent is extended or adjusted under 35 U.S.C. 154(b) by 391 days.

(21) Appl. No.: 10/582,926

(22) PCT Filed: Dec. 7, 2004

(86) PCT No.: PCT/DE2004/002681
§ 371 (c)(1),
(2), (4) Date: May 15, 2007

(87) PCT Pub. No.: WO2005/062441
PCT Pub. Date: Jul. 7, 2005

(65) Prior Publication Data
US 2007/0252560 A1    Nov. 1, 2007

(30) Foreign Application Priority Data
Dec. 24, 2003    (DE) .................................. 103 61 215

(51) Int. Cl.
H02P 11/00    (2006.01)
H02P 9/00    (2006.01)
H02H 7/06    (2006.01)
(52) U.S. Cl. ............................................. 322/28
(58) Field of Classification Search ............ 322/28
See application file for complete search history.

(56) References Cited

U.S. PATENT DOCUMENTS

| | | | | |
|---|---|---|---|---|
| 3,183,422 | A | * | 5/1965 | Stamm .......................... 318/52 |
| 3,512,074 | A | * | 5/1970 | Soper .............................. 322/20 |
| 3,970,858 | A | * | 7/1976 | Rist et al. ........................ 290/14 |
| 4,012,677 | A | * | 3/1977 | Rist et al. ...................... 318/149 |
| 4,012,680 | A | * | 3/1977 | Dickerson et al. ............ 388/806 |

(Continued)

FOREIGN PATENT DOCUMENTS
DE    689 16 660    11/1994
(Continued)

OTHER PUBLICATIONS

International Rectifier: LIN Controlled Alternator Voltage Regulator—Preliminary Data Sheet IRVR101, Edition Sep. 2003, pp. 1-15.

Primary Examiner — Pedro J Cuevas
(74) Attorney, Agent, or Firm — Kenyon & Kenyon LLP

(57) ABSTRACT

An electrical device having a generator, e.g., for use in the vehicle electrical system of a motor vehicle, includes a controller for controlling the generator voltage. In the device, an area is provided in which a voltage control is carried out, and other areas are provided in which a torque control is carried out.

23 Claims, 4 Drawing Sheets

U.S. PATENT DOCUMENTS

| | | | | |
|---|---|---|---|---|
| 4,017,739 A | * | 4/1977 | Hapeman et al. | 290/14 |
| 4,368,417 A | * | 1/1983 | Matsuyama | 322/29 |
| 4,629,968 A | * | 12/1986 | Butts et al. | 322/29 |
| 4,636,706 A | * | 1/1987 | Bowman et al. | 322/28 |
| 4,914,374 A | * | 4/1990 | Iwatani et al. | 322/28 |
| 4,931,715 A | * | 6/1990 | Lee et al. | 318/709 |
| 4,982,567 A | * | 1/1991 | Hashimoto et al. | 60/600 |
| 5,003,781 A | * | 4/1991 | Shibata et al. | 60/600 |
| 5,005,359 A | * | 4/1991 | Tashima et al. | 60/600 |
| 5,020,327 A | * | 6/1991 | Tashima et al. | 60/600 |
| 5,035,114 A | * | 7/1991 | Shibata et al. | 60/612 |
| 5,050,452 A | * | 9/1991 | Morioka | 477/33 |
| 5,061,889 A | * | 10/1991 | Iwatani et al. | 322/28 |
| 5,095,703 A | * | 3/1992 | Okimoto et al. | 60/612 |
| 5,153,498 A | * | 10/1992 | Parro | 322/25 |
| 5,225,764 A | * | 7/1993 | Falater | 322/28 |
| 5,325,043 A | * | 6/1994 | Parro | 322/23 |
| 5,359,518 A | * | 10/1994 | Wimmer | 701/101 |
| 5,373,196 A | * | 12/1994 | Faley | 307/46 |
| 5,504,417 A | * | 4/1996 | Kern et al. | 322/32 |
| 5,610,485 A | * | 3/1997 | Depenbrock et al. | 318/432 |
| 5,668,721 A | * | 9/1997 | Chandy | 180/446 |
| 5,672,954 A | * | 9/1997 | Watanabe | 322/28 |
| 6,097,127 A | * | 8/2000 | Rivera | 310/184 |
| 6,175,217 B1 | * | 1/2001 | Da Ponte et al. | 322/19 |
| 6,294,899 B1 | * | 9/2001 | Tokugawa et al. | 322/28 |
| 6,300,746 B1 | * | 10/2001 | Mueller et al. | 322/29 |
| 6,344,734 B1 | * | 2/2002 | Iwatani et al. | 322/28 |
| 6,469,476 B1 | * | 10/2002 | Barrett et al. | 322/29 |
| 6,555,993 B2 | * | 4/2003 | Taniguchi et al. | 322/28 |
| 6,614,207 B2 | * | 9/2003 | Maehara et al. | 322/28 |
| 6,750,634 B2 | * | 6/2004 | Taniguchi et al. | 322/28 |
| 6,803,747 B2 | * | 10/2004 | Taniguchi et al. | 322/28 |
| 6,836,027 B2 | * | 12/2004 | Lee | 290/40 C |
| 6,876,177 B2 | * | 4/2005 | Namuduri et al. | 322/28 |
| 7,009,365 B1 | * | 3/2006 | Namuduri et al. | 322/23 |
| 7,071,656 B2 | * | 7/2006 | Taniguchi | 322/28 |
| 7,098,628 B2 | * | 8/2006 | Maehara et al. | 322/24 |
| 7,106,028 B2 | * | 9/2006 | Iwatani | 322/28 |
| 7,239,102 B2 | * | 7/2007 | Fujimura | 318/400.14 |
| 7,279,802 B2 | * | 10/2007 | Pasuri | 290/44 |
| 7,298,115 B2 | * | 11/2007 | Nishimura et al. | 322/28 |
| 7,358,705 B2 | * | 4/2008 | Maehara | 322/27 |
| 7,423,351 B2 | * | 9/2008 | Maehara | 290/40 C |
| 7,834,578 B2 | * | 11/2010 | Sato | 318/800 |
| 7,923,945 B2 | * | 4/2011 | Sato et al. | 318/139 |
| 2002/0014773 A1 | * | 2/2002 | Stricker | 290/44 |
| 2003/0107351 A1 | | 6/2003 | Taniguchi et al. | |
| 2004/0021323 A1 | * | 2/2004 | Lee | 290/40 C |
| 2004/0104637 A1 | * | 6/2004 | Dube et al. | 310/177 |
| 2005/0184700 A1 | * | 8/2005 | Fujimura | 318/807 |
| 2006/0043939 A1 | * | 3/2006 | Namuduri et al. | 322/23 |
| 2006/0061320 A1 | * | 3/2006 | Ma et al. | 318/801 |
| 2006/0113954 A1 | * | 6/2006 | Ma et al. | 318/803 |
| 2007/0158121 A1 | * | 7/2007 | Sato | 180/65.3 |
| 2009/0033257 A1 | * | 2/2009 | Sato et al. | 318/400.3 |
| 2009/0242294 A1 | * | 10/2009 | Kikuchi et al. | 180/65.285 |
| 2009/0278483 A1 | * | 11/2009 | Egami | 318/400.3 |
| 2011/0018551 A1 | * | 1/2011 | Yamane et al. | 324/548 |

FOREIGN PATENT DOCUMENTS

| | | |
|---|---|---|
| DE | 199 03 426 | 8/2000 |
| DE | 102 50 172 | 5/2003 |
| DE | 103 09 326 | 10/2003 |
| EP | 1 111 753 | 6/2001 |
| JP | 63-64531 | 3/1988 |
| JP | 2003174797 | 6/2003 |
| WO | WO 2004/106102 | 12/2004 |

* cited by examiner

ELECTRICAL DEVICE AND OPERATING METHOD

FIELD OF THE INVENTION

The present invention relates to an electrical device and a corresponding operating method in which the electrical device is provided for the combined voltage and torque control of an electrical machine converting mechanical energy to electrical energy, such as a generator in the electrical system of a motor vehicle.

BACKGROUND INFORMATION

It is known that switching into the vehicle's electrical system an electrical consumer having high electrical power results in a high load on the generator. Since switching on the electrical consumer leads to a voltage dip in the vehicle's electrical system, a voltage controller assigned to the generator tries to increase the power supplied by the generator by increasing the exciting current. However, this results in the braking torque caused by the generator being increased in such a way that, especially in response to a low rotary speed of the internal combustion engine, an interfering sudden drop of the rotary speed may occur. In order to minimize such a sudden drop in the rotary speed, measures are provided in systems that have a so-called load-response device which prevents the generator from being loaded too greatly. It is thereby also prevented that a sudden drop in rotary speed occurs in the combustion engine. However, since the required electrical power can no longer be supplied, an undesired voltage dip can now occur.

Such a rotary speed change can be countered, at least in certain operating states, in that a sufficient excess torque is supplied. However, this leads to increased usage, in a disadvantageous manner. As an alternative, the generator adjustment can be specifically slowed down. However, this may lead disadvantageously to an increase in the fluctuations of the voltage of the vehicle's electrical system. Such fluctuations are undesired, however, since they disadvantageously influence the service life of the battery, and are able to damage component parts that are sensitive to voltage. As an alternative, an additional consumer could be switched on in a specified manner via a ramp function. However, this requires a greater switching technology expenditure, and therefore leads to higher product costs. In all the alternatives mentioned, an optimum adaptation to the actually available excess torque is not readily possible.

A method is described in published German patent document DE 39 31 897 for voltage control for generators in motor vehicles, in which, in a first time interval, the generator output voltage is set to a maximum value, so that reliable loading of the vehicle's battery takes place independently of the environmental temperature. In a second time interval, the generator output voltage is regulated usually as a function of the battery temperature, according to a known method. In this context, the establishment of the first time interval takes place as a function of the loading state of the battery.

SUMMARY

The present invention provides a possibility, during operation of the device, to adapt the adjustment speed of the voltage situation to the actual speed of the torque provisioning. For this, a coordinating unit is provided which establishes in which way individual variables are set and changed, in order to obtain optimum control. The control concept according to the present invention makes it possible for this coordinating unit to adjust extreme conditions, such as voltage control at great torque changes, torque control at strong voltage fluctuations, as well as any intermediate conditions. Lastly, this leads to an adaptation of the dynamics of the generator to the actually possible engine dynamics.

The variables voltage and torque are examined in parallel. The generator control may be divided into three areas of control, in this context.

The first area of control relates to a voltage control in the immediate surround field of the setpoint voltage, and in response to changes in the braking torque, only up to the set excess torque.

The second area of control relates to the situation in which the generator cannot adjust the load change and the voltage change using the available excess torque, but the voltage deviation is still just within the admissible boundaries. In this context, the boundary value (excess torque) is able to be changed within the possibilities of the torque buildup in any time-dependent manner. Different strategies may be implemented, in this context, depending on the objective.

The third area of control relates to the situation in which the vehicle's electrical system voltage lies outside admissible boundaries. In this case the voltage control has the highest priority. The boundaries of the areas mentioned may be displaced at will, within the meaning of optimum adjustment.

DETAILED DESCRIPTION

Figure 1:
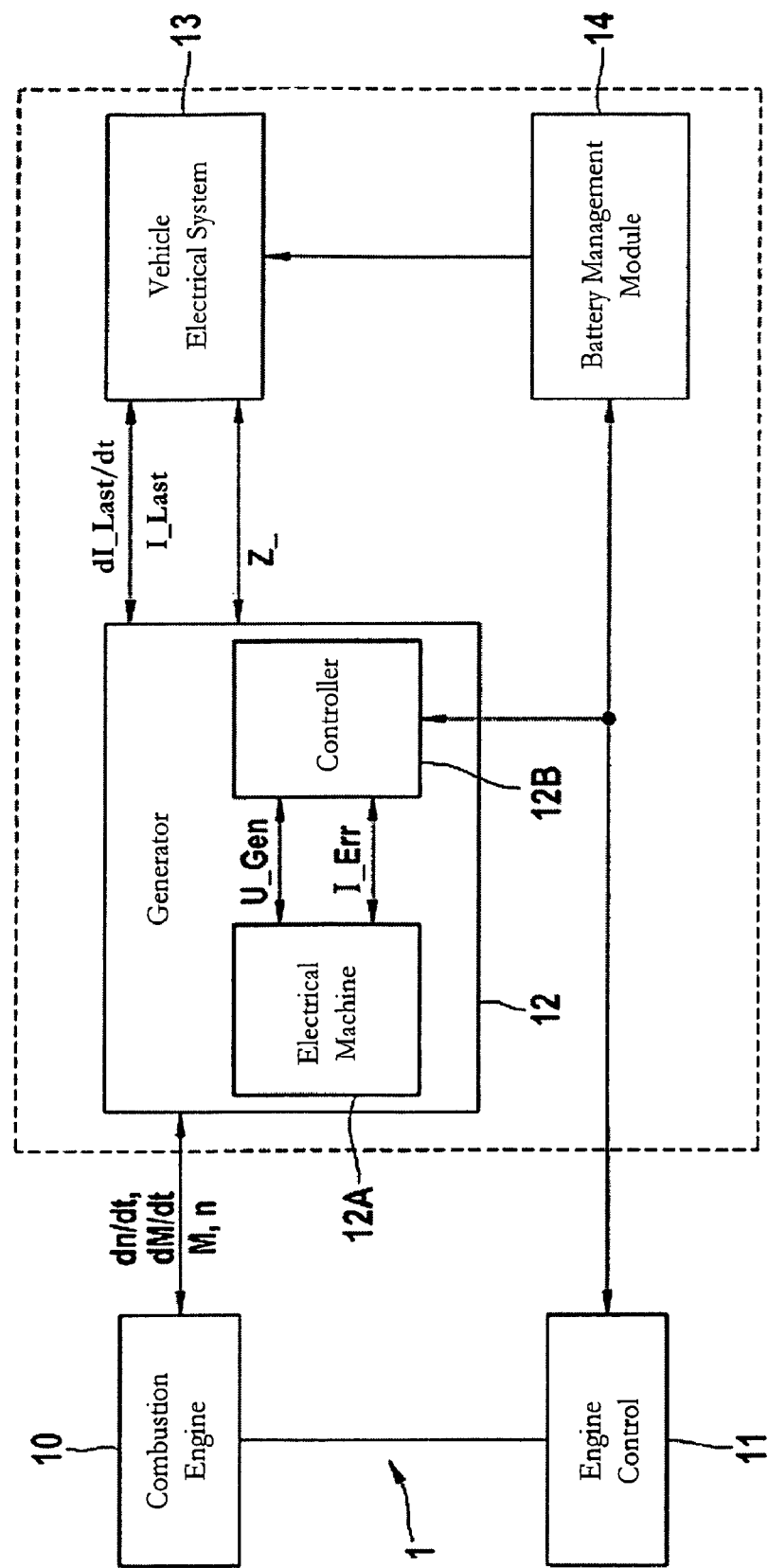
FIG. 1 shows a first block diagram of a system including a combustion engine and an electrical device having a generator and a vehicle electrical system.

FIG. 1 shows a first block diagram of a system 1 including a combustion engine and a device having a generator and a vehicle electrical system. Various functional modules are shown schematically, and so are the functional connections between these functional modules. Reference numeral 10 designates a combustion engine, reference numeral 11 designates an electronic engine control assigned to the combustion engine. Reference numeral 12 designates an electric generator which includes an electrical machine 12A and a controller 12B. Electrical machine 12A is driven by combustion engine 10, and converts the mechanical energy generated by combustion engine 10 to the electrical energy required for a vehicle electrical system. The vehicle electrical system shown only schematically is designated by Reference numeral 13. System 1 also includes a functional module battery management, which bears reference numeral 14. Vehicle electrical system 13 and generator 12 are linked via load current I_Last. When a strong electrical consumer is switched on in vehicle electrical system 13, such as a rear window heater in the wintertime, a great change with time dI_Last/dt of load current I_Last takes place, and consequently a high load on generator 12 is triggered. The great change with time of the load current, in this case a great increase of load current I_Last, leads to a sudden drop in voltage U_Gen that is given off by electrical machine 12A. Electrical machine 12A and controller 12B are linked to each other via the variables voltage U_Gen and exciting current I_Err. As soon as controller 12B records the drop in voltage U_Gen, it tries to increase the power given off by generator 12 by controlling and correspondingly increasing exciting current I_Err. However, this also increases the braking torque caused by generator 12. combustion engine 10 and generator 12 are linked to each other via the variables torque M and rotary speed n, as well as their changes with time, dM/dt and dn/dt. The increase in exciting current I_Err triggered by controller 12B and the increase, effected thereby, of braking torque M of generator 12 have an effect on the rotary speed n of combustion engine 10. Especially in the case of low rotary speeds n of combustion engine 10, an undesired braking of the speed under load may occur. The present invention provides a possibility, during operation of the above-described system 1, to adapt the adjustment speed of the voltage to the actual speed of the torque provisioning.

Figure 2:
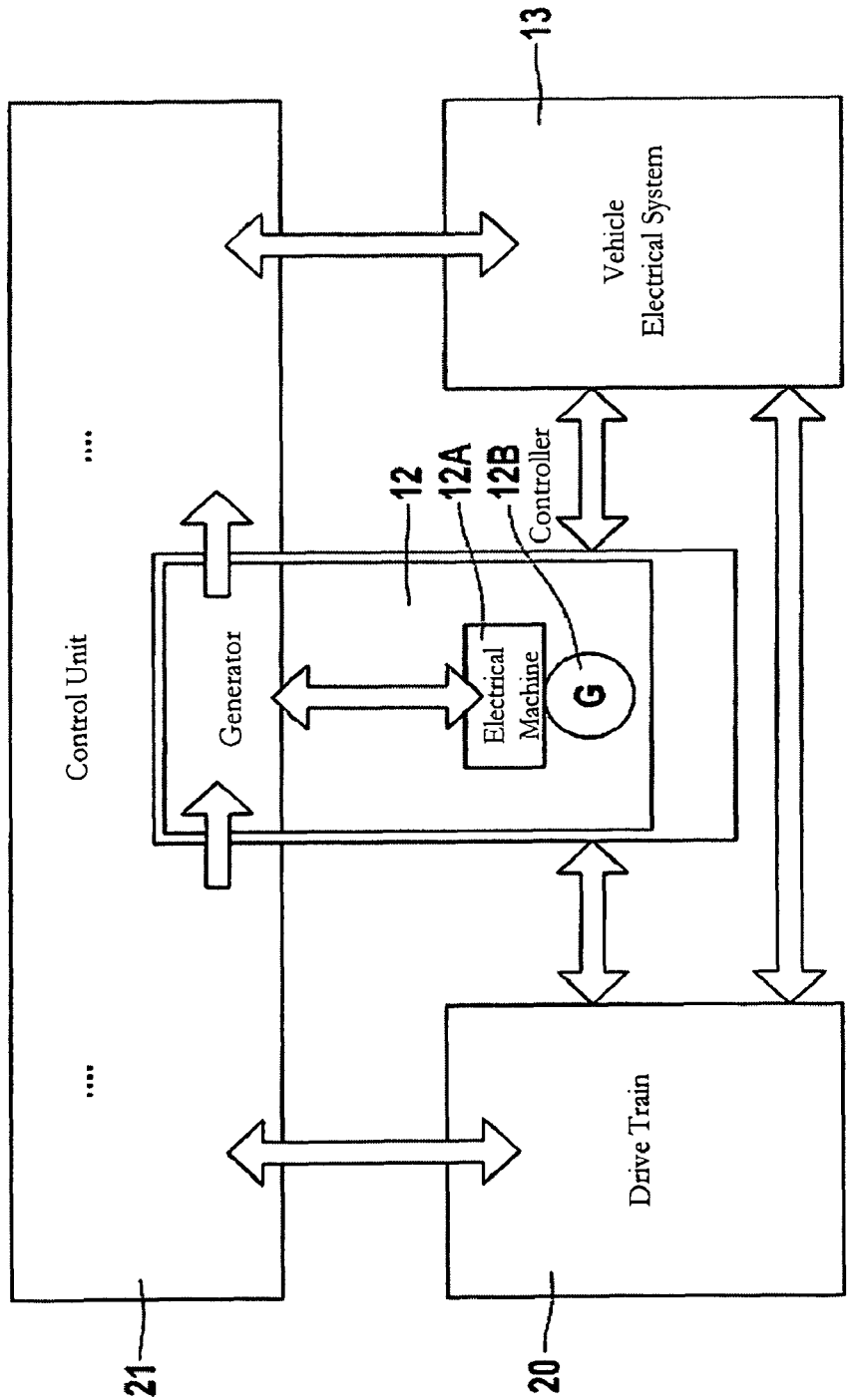
FIG. 2 shows a second block diagram including functional modules for the control of the generator.

FIG. 2 shows a second block diagram in which diverse functional modules are shown for controlling generator 12. Generator 12 includes electrical machine 12A and a controller 12B. Reference numeral 13 designates a functional module representing the vehicle electrical system. Functional module 20 represents the drive train of the vehicle. Reference numeral 21 designates at least one control unit which coordinates the functional sequence in the control of generator 12. The arrows and double arrows shown in FIG. 2 indicate functional linkages that exist between the individual structural components and functional modules.

Figure 3:
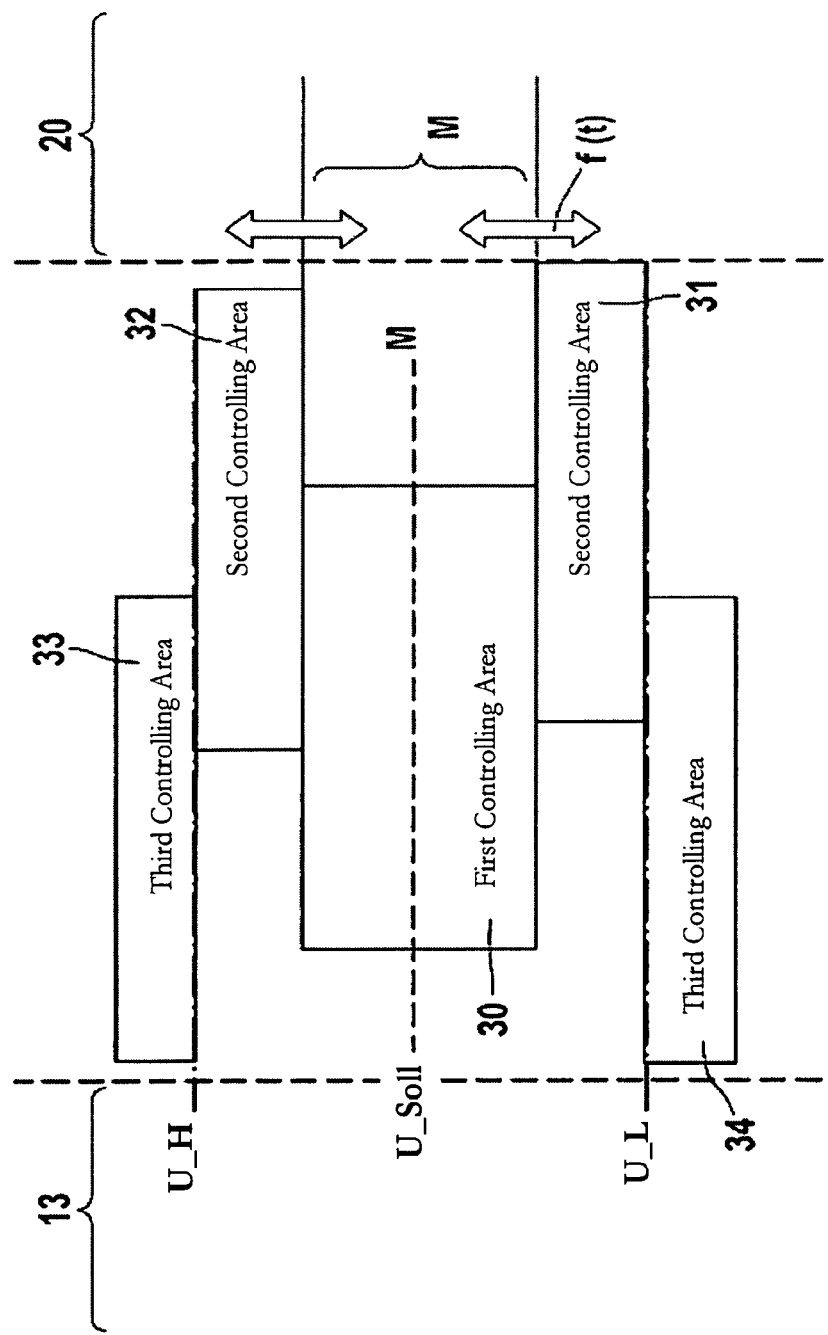
FIG. 3 shows a third block diagram showing control areas.

The present invention provides an electrical device, having a generator, in which an extraordinarily flexible control of the generator is made possible, in order to ensure as great a voltage constancy as possible and as great an operating safety as possible. To achieve this, according to the present invention, various controlling areas are provided which make possible an optimum controlling strategy. This is explained in the light of FIG. 3, which shows a third block diagram showing controlling areas.

This illustration, in turn, also clarifies the interaction between the vehicle electrical system (functional module 13 in FIG. 2) and the drive train (functional module 20 in FIG. 2). Altogether, essentially three types of controlling areas may be characterized, which are further subdivided if necessary. In a first area 30, which lies in the immediate surround field of setpoint voltage U_Soll, a voltage control is provided. In this context, if changes in torque M occur, these are permitted up to a specifiable boundary value, excess torque M_Überschuss. Next to this first controlling area (area 30), there adjoins a controlling area (areas 31, 32) in which generator 12 is not able to adjust occurring load changes and voltage changes using the available, specifiable excess torque M_Überschuss, the occurring voltage deviation, however, still being within an admissible voltage range. In this context, the admissible voltage range is determined by the specifiable boundary values U_H and U_L. Finally, in a third controlling, area (areas 33, 34), there is a situation in which the voltage of vehicle electrical system 13 is outside the admissible voltage range, that is, it exceeds upper boundary value U_H or undershoots lower boundary value U_L.

Figure 4:
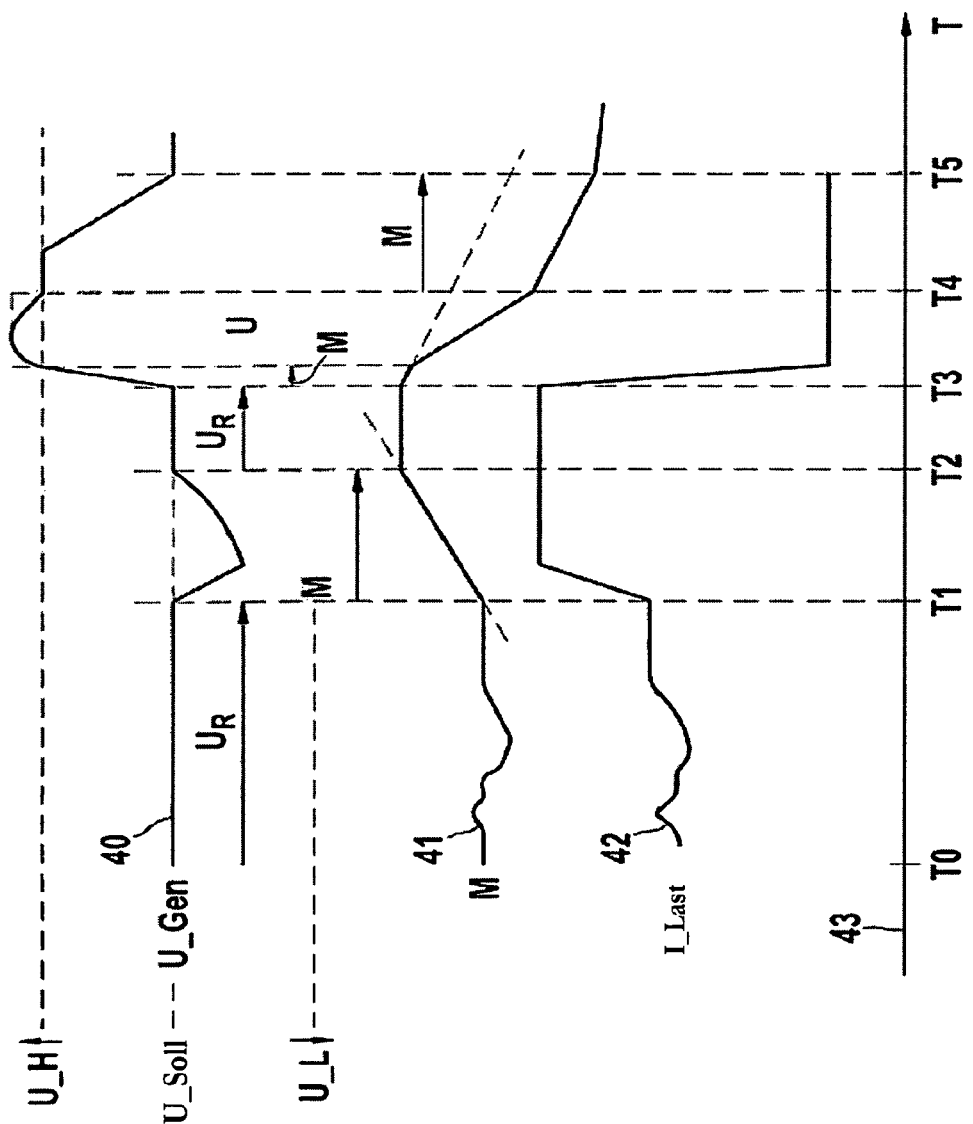
FIG. 4 shows various curves plotted against time.

The diagram in FIG. 4 shows diverse curves in light of which the functioning of electrical device 1 will be explained below. Curves, which are plotted over a time axis, represent certain variables as functions of time. Curve 42 shows load current I_Last as a function of time T. Moreover, torque M is shown as a function of time T in curve 41. Finally, generator voltage U_Gen is shown as a function of time T in curve 40. In addition, in the area of the curve representing the generator voltage, special voltage values are emphasized, namely, a setpoint value U_Soll, a minimum value U_L and a maximum value U_H. In this case, setpoint value U_Soll lies between the extreme values U_H and U_L named. We shall first examine the time interval between a point in time T0 and a point in time T1. Curve 42 shows that load current I_Last has a certain level and fluctuates only within comparatively narrow boundaries, which indicates an essentially constant load of vehicle electrical system 13. Curve 40, which represents generator voltage U_Gen, shows that generator voltage U_Gen is essentially constant and that it is regulated to its setpoint value U_Soll in the examined time interval T0-T1. Curve 41, representing torque M, also shows relatively low fluctuations of torque M, since quite small torque changes are sufficient for compensating for the fluctuations of load current I_Last. Consequently, interval T0-T1 corresponds to the first area of control already mentioned above, in which a voltage control takes place in the immediate surround field of setpoint voltage U_Soll, and in which changes of torque M are permitted up to a specifiable excess torque.

As curve 42 shows, load current I_Last rises steeply at time. T1, because an electrical consumer has been switched on that has a large power consumption and that loads vehicle electrical system 13. As curve 40 shows, this great load results in a voltage dip. The generator voltage drops below setpoint voltage U_Soll and approximates lower boundary value U_L. At this point the second area of control is present, in which generator 12 is no longer able to adjust the load change and voltage change using the specifiable and available excess torque, but the deviation of the generator voltage is still just within the permissible boundary values U_H and U_L. In order to compensate for the load change and the voltage deviation associated with it, an increase in torque M is provided, and the system switches over from voltage control to torque control. Torque M rises to a higher value until at time T2 a value of torque M is reached which is sufficient for compensating the load change. At this time T2, generator voltage U_Gen has reached its setpoint value U_Soll again, and a voltage control is carried out again. In this connection, the present invention makes possible an extraordinarily flexible adjustment to difficult operating situations, in order, on the one hand, to compensate for load changes as rapidly as possible, and to guarantee as great a voltage constancy, as possible in the process. In this manner, great reliability of the vehicle electrical system and as great a protection of voltage-sensitive components as possible are achieved.

According to different example embodiments of the present invention, different strategies may be employed for the control of the torque in the area of torque control. For instance, in an example embodiment torque M may rise linearly, the increase being implementable using different slopes. According to one further example embodiment, a more complex, nonlinear function may be provided for the rise in torque M, in addition, dynamic adjustments to the respective situation being also possible in order to attain an optimum result. For example, torque M may be changed according to a function F=F(T, P), where T is the time and P is an operating parameter of the device. In a further example embodiment, a functional dependence of the torque on influencing variables may be implemented also by a corresponding characteristics map K, in which a certain value of torque M is assigned to corresponding values of one or more influencing variables.

As the course of load current I_Last shows according to curve 42 in FIG. 4, load current I_Last drops off greatly at time T3. For example, a strongly powered electrical consumer may have been switched off from the vehicle electrical system. It may be seen from the course of curve 40 that, as a result, generator voltage U_Gen rises sharply and even exceeds maximum value U_H. At this point the third area, mentioned briefly above, is now present, in which the generator voltage lies outside the permissible boundaries U_H, U_L. In this situation, the voltage control has the highest priority, since voltage-sensitive components or assemblies are greatly at risk. Therefore, as shown in curve 41, it is first taken care that torque M is reduced to a correspondingly low value, in order to attain as fast as possible a voltage drop to a noncritical value. This is the case approximately at time T4, at which the voltage reaches the maximum value U_H again or falls below it. At this time T4, a torque control sets in again, until the torque that is too high has dropped down to a lower level that is sufficient for the lower power demands, and the voltage has attained its setpoint value U_Soll again. This is the case approximately as of time T5. Beginning at this point in time, the system switches over to voltage control.

With the aid of the curve illustrations in FIG. 4, a situation was explained in which a rise in voltage above the maximum value has taken place. An analogous controlling procedure would proceed in response to the undershooting of the minimum value U_L of the voltage.

In one example embodiment of the present invention, the values U_Soll, U_H, U_L, may be specified in an application-specific manner, as well as the boundaries between the two controlling types torque control and voltage control and the width of the areas in which the respective control type is dominant.

In one advantageous example embodiment of the present invention, however, it is also possible to dynamically adjust at least some of the variables named, even during driving operation of a vehicle equipped with the electrical device. Thus, for example, the boundaries (see illustration in FIG. 3), at which switchover takes place between voltage control and torque control, may be designed as a function of operating characteristics variables of the device or of the vehicle. Such a dependence is able to be expediently implemented by appropriate characteristics maps. In a corresponding manner, the widths of the areas, in which a voltage control or a torque control is to take place, or the transition locations between these two areas, may be designed variably. This example embodiment is distinguished by particularly great flexibility.

What is claimed is:

1. An electrical device for controlling a generator in an electrical system of a motor vehicle, comprising:
a controller configured to control a voltage of the generator by outputting a control signal to the generator in response to changes in the generator voltage, wherein the controller provides a first area of operation based on the value of the generator voltage, in which a voltage control is performed to regulate the generator voltage, to the exclusion of performing a torque control to regulate a braking torque exerted by the generator, and at least one second area of operation based on the value of the generator voltage, in which the torque control is performed, to the exclusion of performing the voltage control, the controller transitioning from the first area to the at least one second area when the generator voltage goes beyond one of a first upper threshold value and a first lower threshold value, the first upper threshold value and the first lower threshold value being defined by a boundary of the first area;
wherein the generator is coupled to an engine to generate electrical power.

2. The electrical device as recited in claim 1, wherein at least one of: a) a transition between the first area and the at least one second area, and b) a width of the first area and the at least one second area, is defined according to the value of at least one operating parameter of the electrical device that influences one of the torque and the generator voltage.

3. The electrical device as recited in claim 2, wherein the first upper threshold value and the first lower threshold value extend from a setpoint voltage lying between the first upper threshold value and the first lower threshold value.

4. The electrical device as recited in claim 2, wherein the first area is defined as a function of a maximum allowable change in torque.

5. The electrical device as recited in claim 2, wherein two second areas are provided for the torque control, and wherein the two second areas extend on both sides of the first area for the voltage control.

6. The electrical device as recited in claim 2, wherein the at least one second area for the torque control lies within a voltage range defined by two voltage boundary values.

7. The electrical device as recited in claim 2, wherein, in the at least one second area for the torque control, a torque variable is controlled to vary linearly.

8. The electrical device as recited in claim 2, wherein, in the at least one second area for the torque control, a torque-influencing variable is controlled as a function of time and the at least one operating parameter of the electrical device.

9. The electrical device as recited in claim 2, wherein, in the at least one second area for the torque control, a torque-influencing variable is controlled according to a functional relationship defined in a characteristics map.

10. The electrical device as recited in claim 1, wherein at least one of: a) a transition between the first area and the at least one second area, and b) a width of the first area and the at least one second area, is defined according to the value of at least one operating parameter of the electrical device that influences one of the torque and the generator voltage, wherein the first upper threshold value and the first lower threshold value extend from a setpoint voltage lying between the first upper threshold value and the first lower threshold value, and wherein the first area is defined as a function of a maximum allowable change in torque.

11. The electrical device as recited in claim 10, wherein two second areas are provided for the torque control, wherein the two second areas extend on both sides of the first area for the voltage control, wherein the at least one second area for the torque control lies within a voltage range defined by two voltage boundary values, and wherein, in the at least one second area for the torque control, a torque variable is controlled to vary linearly.

12. The electrical device as recited in claim 10, wherein two second areas are provided for the torque control, wherein the two second areas extend on both sides of the first area for the voltage control, wherein the at least one second area for the torque control lies within a voltage range defined by two voltage boundary values, and wherein, in the at least one second area for the torque control, a torque-influencing variable is controlled as a function of time and the at least one operating parameter of the electrical device.

13. The electrical device as recited in claim 10, wherein two second areas are provided for the torque control, wherein the two second areas extend on both sides of the first area for the voltage control, wherein the at least one second area for the torque control lies within a voltage range defined by two voltage boundary values, and wherein, in the at least one second area for the torque control, a torque-influencing variable is controlled according to a functional relationship defined in a characteristics map.

14. The electrical device as recited in claim 1, wherein a transition between the first area and the at least one second area is defined according to the value of at least one operating parameter of the electrical device that influences one of the torque and the generator voltage.

15. The electrical device as recited in claim 1, wherein a width of the first area and the at least one second area is defined according to the value of at least one operating parameter of the electrical device that influences one of the torque and the generator voltage.

16. A method for controlling an operation of a generator in connection with a vehicle electrical system of a motor vehicle, comprising:
    recording a voltage of the generator, which is coupled to an engine to generate electrical power;
    determining whether the recorded voltage lies in a specified range from a setpoint voltage;
    performing a voltage control in which the generator voltage is regulated with reference to the setpoint voltage, to the exclusion of performing a torque control in which a braking torque exerted by the generator is regulated, if the recorded voltage lies in the specified range from the setpoint voltage, the specified range from the setpoint voltage defining a first area of operation;
    performing the torque control, to the exclusion of performing the voltage control, if the recorded voltage: a) lies outside the specified range from the setpoint voltage; and b) lies within a predetermined range defined by voltage boundary values, the area specified by a) and b) defining at least one second area of operation; and
    specifying a highest priority for the voltage control, if the recorded voltage lies outside the predetermined range defined by the voltage boundary values.

17. The method as recited in claim 16, wherein, in performing the torque control, the torque is controlled to vary linearly.

18. The method as recited in claim 16, wherein, in performing the torque control, the torque is changed as a function of time and a specified operating parameter of an electrical device that includes the generator and a controller, wherein a value the specified operating parameter influences the torque.

19. The method as recited in claim 16, wherein, in performing the torque control, the torque is changed according to a functional relationship defined in a characteristics map.

20. The method as recited in claim 16, wherein at least one of: a) a width of the first area and a width of the at least one second area, and b) a width of a transition area between the first area and the at least one second area, is predetermined.

21. The method as recited in claim 16, wherein at least one of: a) a width of the first area and a width of the at least one second area, and b) a width of a transition area between the first area and the at least one second area, is adjusted according to operating parameters of an electrical device that includes the generator and a controller, during a driving operation of the motor vehicle equipped with the electrical device, wherein the operating parameters influence one of the generator voltage and the torque.

22. The method as recited in claim 16, wherein a width of the first area and a width of the at least one second area is predetermined.

23. The method as recited in claim 16, wherein a width of a transition area between the first area and the at least one second area is predetermined.

* * * * *